Patented June 4, 1946

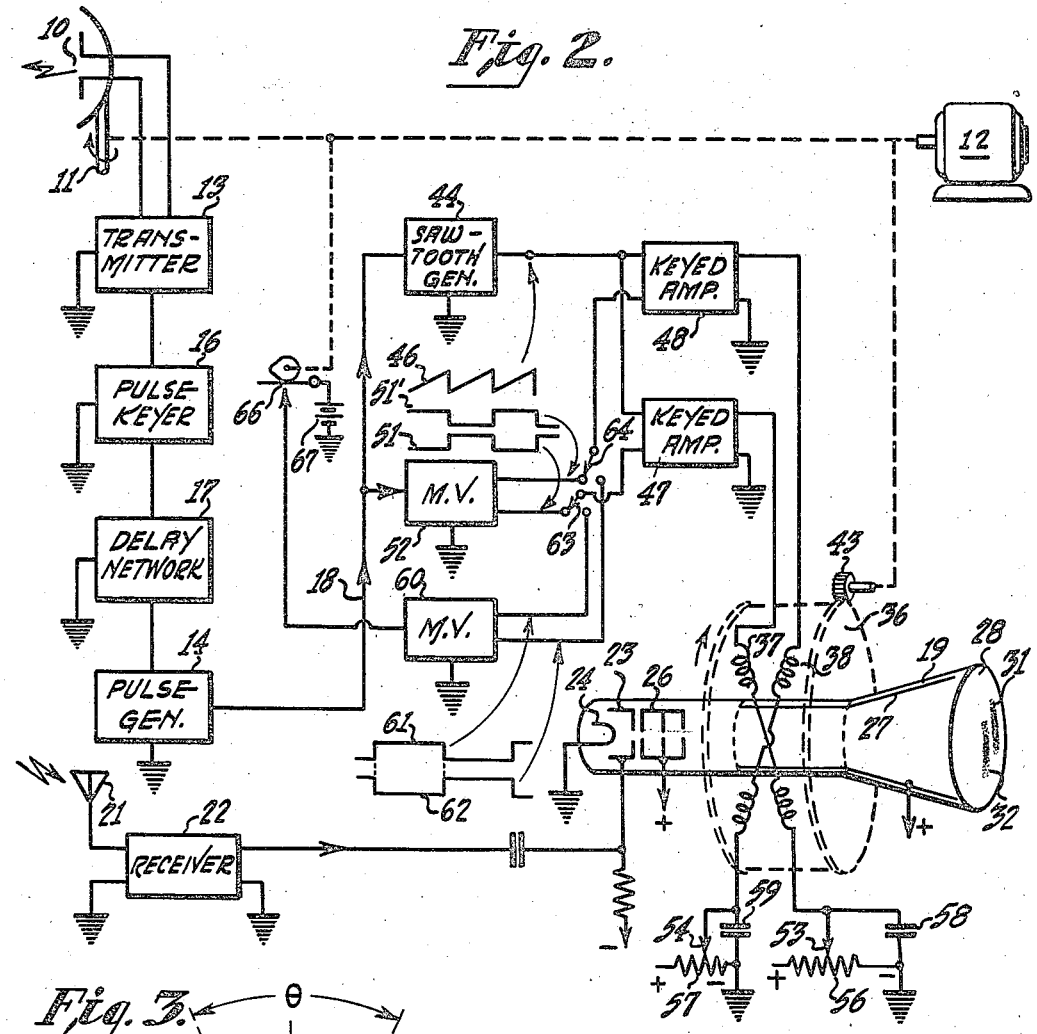

2,401,432

UNITED STATES PATENT OFFICE 2,401,432

RADIO POSITION LOCATOR

David G. C. Luck, Princeton, N. J., assignor to Radio Corporation of America, a corporation of Delaware Application September 29, 1943, Serial No. 504,512

6 Claims. (Cl. 250—1)

My invention relates to radio locator systems of the type that transmit a radio wave and then receive it after it has been reflected from an object or target to be located; the invention relates particularly to systems of the type having means for determining both the azimuth of and the distance to the target.

Such systems comprise a rotating directive antenna that may be either the transmitting antenna or the receiving antenna, or both, and they further comprise a suitable indicator such as a cathode ray tube having deflecting means which deflects the cathode ray radially in a direction that changes in synchronism with the change in the antenna position. Thus the direction of the target is shown on the cathode ray tube screen by the angular position of the indication produced by signals reflected from the target. The distance is determined, for example, by transmitting radio pulses, receiving them after reflection from the target, and utilizing the reflected pulses to increase the intensity of the cathode ray momentarily as it is being deflected radially in synchronism with the pulse transmission.

In the previous systems of this type, which are referred to as plan position indicator systems, the direction of the target is indicated on the cathode ray tube by the brightest or central portion of an arc-like indication formed on the screen as the antenna rotates past the target. Since the end of the lobe of the antenna radiation pattern is rather broad, it may be difficult at times to estimate exactly the location of the central or brightest part of the target indication.

An object of the present invention is to provide an improved radio position locator.

Another object of the invention is to provide an improved method of and means for determining the position of a wave reflecting object.

Still another object of the invention is to provide an improved radio pulse-echo position locator.

A still further object of the invention is to provide an improved indicator for a plan position indicator system.

In a preferred embodiment of the present invention the indicator system is so designed that the reflected signals from a target produce on the cathode ray tube screen two indications which are both angularly and radially displaced with respect to each other. The direction of the target is represented by a radial line drawn through the region of equal brightness of the two displaced indications.

The desired angular displacement of the target indications may be obtained by providing a rotatable deflecting yoke with two pairs of deflecting coils that are angularly displaced with respect to each other, while the desired radial displacement may be obtained by properly adjusting the centering currents flowing through the two pairs of deflecting coils. The sawtooth current for producing radial deflection is supplied alternately to the two pairs of deflecting coils and in synchronism with the pulse transmission.

The invention will be better understood from the following description taken in connection with the accompanying drawing in which Figure 1 is a view of the screen end of the cathode ray tube illustrating the target indication that is obtained with the system illustrated in Fig. 2, Figure 2 is a block and circuit diagram of a plan position indicator embodying the invention, and Figure 3 is an end view of a deflecting yoke that may be employed in the system of Fig. 2.

Fig. 2 shows the invention applied to a pulse-echo system having a directive transmitting antenna 10 which is rotated about a vertical shaft 11 by means of a motor 12. Periodically recurring radio pulses of very short duration are supplied to the antenna 10 from a radio transmitter 13 that is pulse modulated by means of a pulse generator 14 and a pulse keyer 16. A delay network 17 may be provided to delay the pulses supplied to the pulse keyer 16 with respect to the pulses that are supplied over a conductor 18 for initiating deflection of the cathode ray in an indicator tube 19.

After reflection from a target, the pulses are picked up by a receiving antenna 21, are amplified and demodulated by a receiver 22, and are then applied to the control grid 23 of the cathode ray tube 19. The tube 19 may be of conventional design comprising a cathode 24, the control grid 23, a first anode 26 and a second anode 27. A fluorescent screen 28 is applied to the inner face of the tube envelope.

Fig. 1 shows the kind of indication that is produced by the presence of a reflecting target. The indication consists of two arc-like spots 31 and 32, each of which is brightest at the middle of the arc. The azimuth or direction of the target from the locator system is indicated by a line 33 drawn half way between the two bright portions of the spots 31 and 32. The correct position of the azimuth line 33 can best be determined by determining the point where the two arc-like spots are of equal brilliance. The distance calibration, indicated by the dotted-line circles, may be with reference to the outer spot 31, that is, the distance of the outer spot from the center of the screen indicates the distance to the target.

The above-described type of indications may be obtained by providing the cathode ray tube 19 with a rotatable electromagnetic deflecting yoke 36 having two pairs of deflecting coils 37 and 38 which are angularly displaced with respect to each other. One suitable yoke construction is shown in Fig. 3 where the deflecting coils 37 and 38 are of the distributed type described in Tolson Patent 2,167,379, issued July 25, 1939. The coils are supported by tubes 39 and 41 of insulating material, and are surrounded by a cylinder 42 of suitable magnetic material. The yoke 36 is rotated through gears 43 by the motor 12, the rotation being synchronous with the rotation of the antenna 10. The angular displacement θ of the coils 37 and 38 may, for example, be equal to the angle between the two half-output points on the sides of the antenna radiation pattern or lobe.

The cathode ray is deflected alternately in a radial direction by the coils 37 and 38 at a rapid rate while the deflecting yoke is being rotated slowly. The radial deflection is from the center of the screen 28 to its outer circumference. The means for producing the radial deflection comprises a sawtooth generator 44 which is synchronized with the pulse transmission by the pulses from the conductor 18. The sawtooth wave 46 produced by generator 44 is applied to a pair of keyed amplifiers 47 and 48 which have their output circuits connected to the deflecting coils 37 and 38, respectively.

Each of the keyed amplifiers supplies sawtooth deflecting current to a pair of deflecting coils during alternate sawteeth of the applied wave 46, one keyed amplifier supplying deflecting current while the other keyed amplifier is supplying no deflecting current. The keyed amplifiers 47 and 48 may be keyed to operate alternately in this way by applying to them voltages of square wave form 51 and 51', respectively, from a multivibrator 52 which is synchronized by the pulses from the conductor 18, the waves 51 and 51' being of opposite polarity and being applied through switches 63 and 64.

As previously stated, the radial displacement of the indications 31 and 32 is obtained by suitable adjustment of the centering currents. Various satisfactory centering circuits are known in the art, the circuit of Stocker Patent 2,086,926, issued July 13, 1937, being an example. In the drawing the centering means for the deflecting coils 37 and 38 are represented by the adjustable taps 53 and 54, respectively, on voltage divider resistors 56 and 57. Bypass capacitors are shown at 58 and 59.

From the foregoing, it will be apparent that instead of estimating the position of a broad brightness maximum of a single trace, the azimuth is more sharply determined by estimating the point of equal brightness of the two adjacent traces. Since brightness comparison is made between a point on one trace which has been excited much more recently than the point on the other trace, the decay of phosphorescence will displace the indicated azimuth by a definite amount which must be allowed for in azimuth-scale calibration. For easiest and most accurate reading the tube screen should be such that the fluorescent flash upon passage of the cathode-ray beam is as weak and of as short duration as possible, while the period of decay of phosphorescence following beam passage is as long as possible compared to the period of antenna-system rotation.

In another embodiment of the invention, the deflecting current is switched alternately to the two deflecting coils at a comparatively low switching rate as by means of a multivibrator 60 that supplies comparatively low frequency square waves 61 and 62 to the keyed amplifiers 47 and 48, respectively, through the switches 63 and 64. The centering taps 53 and 54 are adjusted to superimpose the indications 31 and 32 whereby a single trace having a dashed or dotted appearance is produced. Each of the two interlocking sets of spaced dashes making up this continuous trace have a maximum brightness at a certain azimuth, but these azimuths differ by the angular displacement between the deflecting coils. Between these two maxima, there is a narrow region of approximately equal brightness; in this region, the dashed appearance of the trace vanishes, giving a clear and definite azimuth indication.

The multivibrator 60 should be synchronized with the rotation of the deflecting yoke 36. This may be done by means of a cam operated switch 66 which is driven by the motor 12, thus connecting a battery 67 to the multivibrator 60 periodically. The frequency of the multivibrator 60 is made such as to produce the best number of arc divisions for the directivity of the antenna being used, and should be a whole number times the frequency of the yoke rotation.

Various other modifications of the invention are possible. For example, a frequency-sweep distance-measuring system, such as has been used for radio altimeters, may be used instead of the pulse-echo system. In this case, strength of the beat note between outgoing and returning signals should be used to control beam intensity and beat-note frequency to control the current through the deflecting coils.

I claim as my invention:

1. A radio locator system comprising a rotatable directive antenna, means including said antenna for transmitting radio pulses and receiving them after reflection from a target, a cathode ray tube having a pair of angularly spaced deflecting means for deflecting the cathode ray radially, means for applying alternately to said spaced deflecting means a deflecting wave which is in synchronism with said pulse transmission whereby said radial deflection is produced by radial deflection fields, means for rotating said radial deflection fields in synchronism with the rotation of said directive antenna, and means for controlling the intensity of the cathode ray in accordance with the intensity of the reflected pulses.

2. A radio locator system comprising means for transmitting radio pulses and for receiving them after reflection from a target, said means including a rotatable directive antenna, a cathode ray tube having a fluorescent screen and having means for producing an electron beam and directing it against said screen, means including two angularly spaced deflecting devices for deflecting said beam radially by radial deflection fields and in synchronism with said pulse transmission and with the radial deflection being successively along two radial lines having said angular spacing, means for rotating said radial deflection fields in synchronism with the rotation of said directive antenna, and means for con- trolling the intensity of the cathode ray in accordance with the intensity of the reflected pulses.

3. A radio locator system comprising a rotatable directive antenna, means including said antenna for transmitting radio pulses and receiving them after reflection from a target, a cathode ray tube having a pair of angularly spaced deflecting means for deflecting the cathode ray radially, means for applying a deflecting wave alternately to said deflecting means and in synchronism with said pulse transmission to produce said radial deflections by radial deflection fields, means for rotating said radial deflection fields in synchronism with the rotation of said directive antenna, means for controlling the intensity of the cathode ray in accordance with the intensity of the reflected pulses, and centering means for causing the radial deflections produced by said angularly spaced deflecting means to be radially displaced with respect to each other.

4. A radio locator system comprising means for transmitting radio pulses and for receiving them after reflection from a target, said means including a rotatable directive antenna, a cathode ray tube having a fluorescent screen and having means for producing an electron beam and directing it against said screen, means including a deflecting yoke having two angularly spaced deflecting coils for deflecting said beam radially in synchronism with said pulse transmission and with the radial deflection being successively along two radial lines having said angular spacing, means for rotating said deflecting yoke in synchronism with the rotation of said directive antenna, and means for controlling the intensity of the cathode ray in accordance with the intensity of the reflected pulses.

5. The invention according to claim 4 wherein centering means is provided for radially displacing the deflections produced by said angularly spaced deflecting coils.

6. The invention according to claim 4 wherein means is provided for alternately interrupting said radial deflections at a rate which is slow compared with the repetition rate of the radial deflection and which is rapid compared with the rate of rotation of the deflecting yoke.

DAVID G. C. LUCK.